Nov. 29, 1966  D. E. STINEBAUGH  3,288,123
SUPERCHARGING ENGINE

Filed July 2, 1964  2 Sheets-Sheet 1

DONALD E. STINEBAUGH
INVENTOR
BY
BUCKHORN, BLORE, KLARQUIST & SPARKMAN
ATTORNEYS

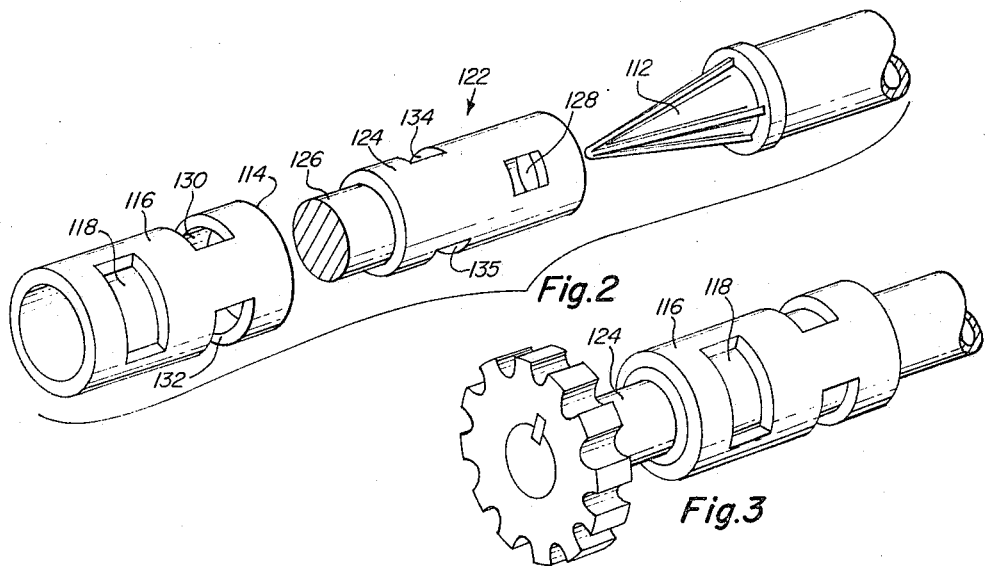
Fig.2
Fig.3
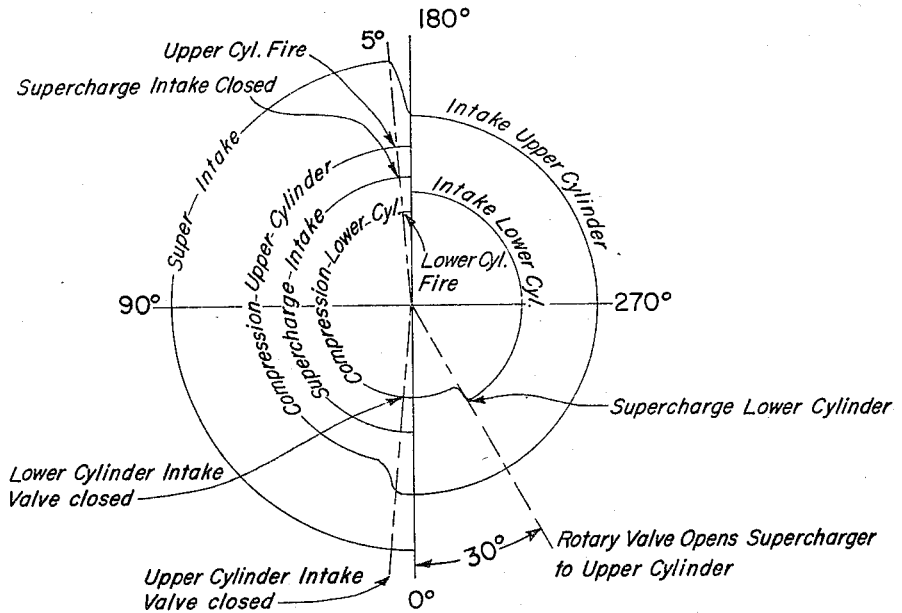
Fig.4

United States Patent Office 3,288,123
Patented Nov. 29, 1966

3,288,123
SUPERCHARGING ENGINE
Donald E. Stinebaugh, Coeur d'Alene, Idaho, assignor to El Don Corporation, Spokane, Wash., a corporation of Washington
Filed July 2, 1964, Ser. No. 379,925
9 Claims. (Cl. 123—57)

This invention relates to a supercharging engine, and more particularly to an engine which is supercharged with an air-fuel mixture.

Engines have been known in the past which supercharge systems. Some types of such engines utilize conventional charging of an air-fuel mixture with supercharging of air only, which requires the air-fuel mixture to be richer than finally desired and carburation control for various speeds is very complex and unsatisfactory. Other types of prior art supercharging engines use an air-fuel mixture in the supercharging but are very complex, difficult to manufacture, difficult to maintain and difficult to control. It would be desirable to have a supercharging engine which is simple, inexpensive and is easily controlled.

An object of the invention is to provide a new and improved supercharging engine.

Another object of the invention is to provide an engine which is supercharged with an air-fuel mixture.

A further object of the invention is to provide a supercharging engine having a supercharging chamber expansible and contractible by a piston of the engine to draw an air-fuel mixture directly from a carburetor and supply the mixture to a cylinder in which the piston is mounted for ignition along with a conventional charge of the same air-fuel mixture.

Yet another object of the invention is to provide a supercharging engine having a pair of tandem pistons movable in tandem cylinders with a supercharging chamber formed by one of the cylinders and its piston adapted to draw an air-fuel mixture directly from a carburetor and pump the mixture alternately to the cylinders to supercharge conventional air-fuel charges in the cylinders.

The invention provides a supercharging engine having first and second, tandem arranged, pistons in first and second, tandem arranged, cylinders. On alternate intake strokes of the pistons, the engine conventionally charges with an air-fuel mixture from a carburetor the portions of the cylinders at one side of the pistons. The engine supercharges the portions of one of the cylinders at the opposite side of its piston on the exhaust and compression strokes of that piston. The supercharging mixture is compressed during the first part of each of the firing and intake strokes of that piston, and the supercharging chamber is connected directly to the cylinders during the latter portions of the intake strokes of the pistons to supercharge the cylinders. Preferably conventional valving means are provided for conventionally charging and exhausting the cylinders, and supercharging valving means serves to control the intake to and exhaust from the supercharging chamber.

A complete understanding of the invention may be obtained from the following detailed description of a supercharging engine forming a specific embodiment thereof, when read in conjunction with the appended drawings, in which:

FIG. 2 is an exploded, perspective view of a valve of the engine of FIG. 1;

FIG. 3 is a perspective view of the valve of FIG. 2; and

FIG. 4 is a chart of the operation of the engine of FIG. 1.

Figure 1:
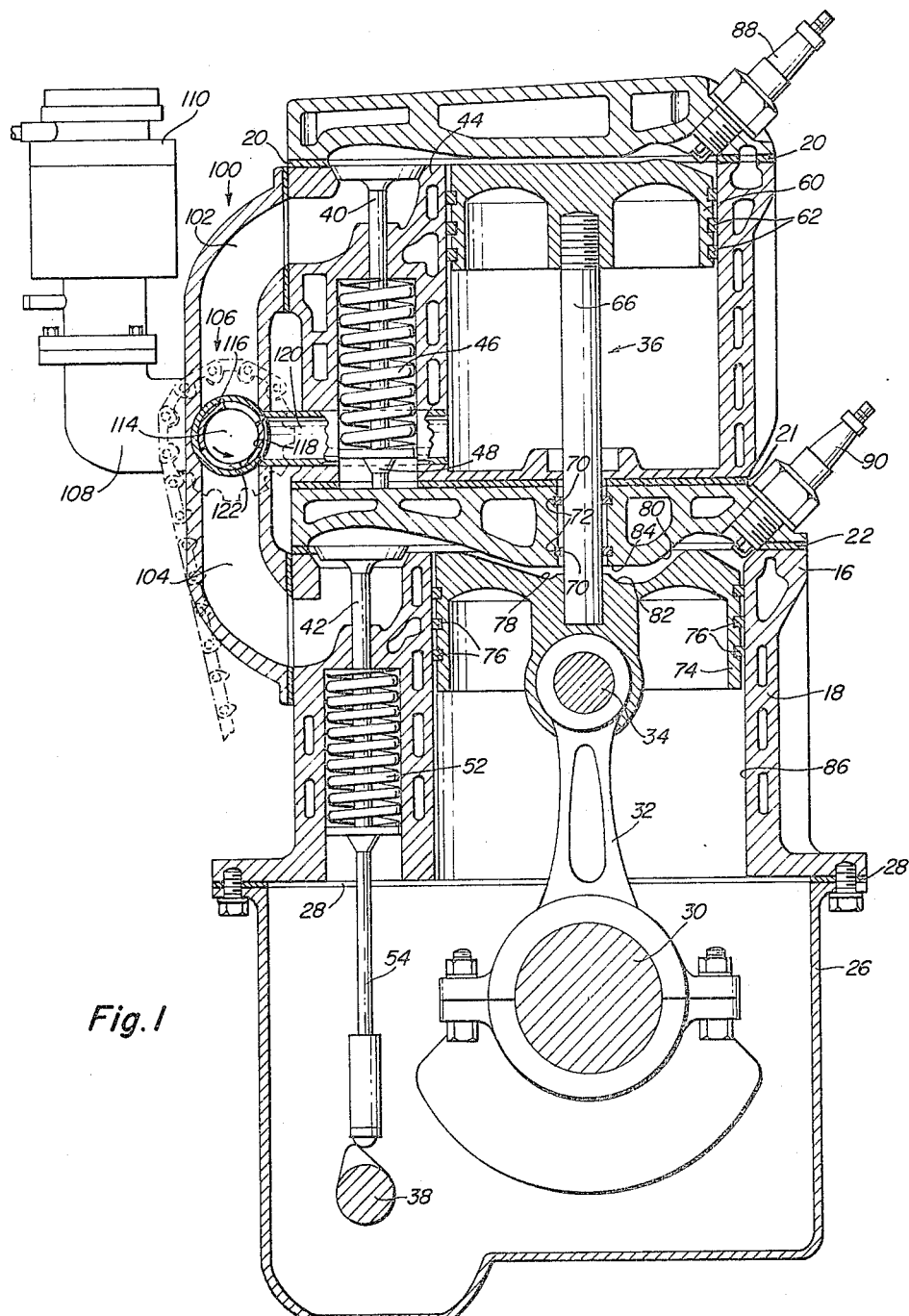
FIG. 1 is a fragmentary, vertical sectional view of a supercharging engine forming one embodiment of the invention.

Referring now in detail to the drawings, a supercharging engine 10 (FIG. 1) forming a specific embodiment of the invention includes an upper head 12, an upper block 14, a lower head 16 and a lower block 18 secured rigidly together by known means (not shown) such as, for example, studs and tie-rods, and having gaskets 20, 21 and 22 compressed therebetween. A pan 26 is secured to the lower block with a gasket 28 positioned therebetween. A crankshaft 30 is coupled by a connecting rod 32 and a wristpin 34 to a double piston member 36. A cam shaft 38 is driven by the crankshaft at half the speed of the crankshaft by known gearing (not shown) to open and close upper and lower intake poppet valves 40 and 42 and similar upper and lower exhaust poppet valves (not shown). The valve 40 cooperates with valve seat 44, and the upper valves are in an L-head arrangement. Spring 46 urges the valve 40 toward its closed position as permitted by a push rod 48 driven by the cam shaft. The lower valves are similarly mounted in an L-head arrangement as illustrated by the valve 42, which is urged toward a closed position relative to valve seat 50 by spring 52 and is controlled by push rod 54 driven by the cam shaft.

The double piston member 36 (FIG. 1) includes a cup-shaped upper piston 60 carrying rings 62 and slidable in cylinder 64 and rigid with cylindrical rod 66 slidable in bore 68 in the lower head 16. Rings 70 carried in grooves 72 in the head 16 sealingly engage the rod 66. A cup-shaped lower piston 74 carrying rings 76 is formed integrally with the rod, and has a generally frustoconical recess 78 generally complementary to frustoconical boss 80 of the head 16. The piston 74 has an annular fillet 82 joining the piston 74 to the rod 66, and the boss is provided with a complementary clearance portion 84. The piston 74 is slidable in cylinder 86. The transverse cross-sectional area of the piston 74 less the transverse cross-sectional area of the rod 66 is equal to the transverse cross-sectional area of the piston 60. Spark plugs 88 and 90 are mounted on the heads 12 and 16, respectively, with their electrodes in the respective combustion chambers below the heads 12 and 16, and are fired near the ends of alternate compression strokes of the piston member 36 under the control of a known type of distributor (not shown) driven in synchronism with the cam shaft 38.

Manifolds 100 and 101 (FIG. 1) have upper and lower intake passages 102 and 104, respectively, leading from rotary valve 106 to the valves 40 and 42. A pipe 108 leads from a known carburetor 110 to intake port 114 of fixed outer sleeve 116, and a known check valve 112 of the reed type positioned between the carburetor and the inlet port 114 of the sleeve 116 of the valve 106. A supercharge intake and exhaust port 118 opens to a supercharging passageway 120 leading to the lower end of the upper cylinder 64, which may be designated as the supercharging chamber. A valve rotor 122 (FIGS. 1 and 2) has a sleeve portion 124 journaled in the sleeve 116, which is fixed. The rotor 122 has a drive shaft portion 124 which is rotated at the same speed as the camshaft by a timing chain drive 126 driven by camshaft 38. The sleeve portion 124 has a outlet port 128 movable between a first position communicating with outlet port 130 in the sleeve 116 and a second position communicating with outlet port 132 in the sleeve 116 positioned diametrically opposite to the port 130. The port 130 leads to the passage 102, and the port 132 leads to the passage 104. Supercharging ports 134 and 135 in the rotor 122 positioned diametrically opposite to each other each is adapted to be moved sequentially between a closed position closed by the sleeve 116, and an open position aligned with the port 118.

In the operation of the engine 10, the crankshaft 30 is rotated in a clockwise direction by the piston member 36, which travels in an upstroke from a lowermost zero position up to the position thereof shown in FIG. 1, which is 180° of movement of the crankshaft, and then in a downstroke back down to the zero position. Each of the pistons 60 and 74 with its respective cylinder 64 and 86, has a four-cycle operation with supercharging of an air-gasoline mixture, and a complete cycle of the engine comprises two revolutions of the crankshaft 30, the cylinder 64 being fired by spark plug 88 for one power stroke and the spark plug 90 being fired for the other power stroke. That is, the cylinders 64 and 90 are 360° out of phase as measured by the rotation of the crankshaft. As illustrated by the chart of FIG. 4, as the piston member 36 travels in its first upstroke from the zero position, which is the exhaust or scavenging stroke of the upper piston 60, and is the compression stroke of the lower piston 74, the valve 40 is closed, the valve 44 is open for a few degrees and then is closed, the exhaust valve (not shown) for the cylinder 64 is open, the exhaust valve (not shown) for the cylinder 86 is closed and the valve 106 connects the supercharging passageway 120 to the pipe 108 leading to the carburetor 110. During this first upstroke of the cycle, the piston 60 scavenges the cylinder 64, the cylinder 86 is receiving a supercharging mixture of gasoline and air from the supercharging chamber immediately below the upper piston 60 for the first few degrees of the cycle after which the valve 44 is closed and during the remaining, major portion of the first upstroke, the piston 74 compresses the air-gasoline mixture thereabove until about 5° from the top of the first upstroke when the spark plug 90 is fired to ignite the compressed air-gasoline mixture in the cylinder 86. During the first upstroke of the piston 60, it draws an air-gasoline mixture into the supercharging chamber therebelow from the carburetor 110 until about 5° before the upper end of the first upstroke, at which point the valve 106 closes port 118. The valve 40 is opened and the exhaust valve (not shown) for the cylinder 64 is closed during the last 5° of the first upstroke. The ignited air-gasoline mixture in the cylinder 86 then drives the piston member 36 downwardly in the first downstroke.

During the first downstroke of the piston member 36 and about the first 5° of the second upstroke, the valve 40 is open. During the first downstroke, the piston 60 draws an air-gasoline mixture from the carburetor into the portion of the cylinder thereabove. During about the first 145° of the 180° of the first downstroke, the air-gasoline mixture in the supercharging chamber below the piston 60 is compressed, and during the remainder of the first downstroke and about the first 5° of the second upstroke, the valves 40 and 106 connect the supercharging chamber to the upper portion of the cylinder 64 and the compressed mixture flows from the supercharging chamber into the upper portion of the cylinder 64 to supercharge the cylinder 64. Thus, the upper portion of the cylinder receives a charge of the air-gasoline mixture directly from the carburetor and then receives a supercharge of the same mixture from the supercharging chamber.

Near the end of the first downstroke, the exhaust valve (not shown) for the cylinder 86 opens. After the first downstroke, the second upstroke begins, during which the piston 74 scavenges the lower cylinder 86, the piston 60 makes it compression stroke and the piston 60 sucks the air-gasoline mixture from the carburetor 110 into the supercharging chamber, the rotor 116 connecting the port 118 to the pipe 108 until about the last 5° of the second upstroke and then closing off the port 118 to close the supercharging chamber. Near the end of the second upstroke, the spark plug 88 ignites the mixture in the upper cylinder, the port 118 is closed, the valve 42 opens and the exhaust valve for the lower cylinder 86 closes.

The second downstroke is the power stroke of the upper piston 60, the charging and supercharging stroke of the lower piston 74 and initial compression and subsequent supercharging of the lower cylinder 86 by the supercharging chamber.

If desired, the rotary valve 106 can be omitted and two additional, poppet type intake valves (not shown) to the cylinders 63 and 86 can be provided, the additional intake valves being mounted in lateral alignment with the exhaust valves (not shown) and the valves 40 and 42 and being connected to a passageway connecting the pipe 108 to the supercharging chamber, the passageway having near its junction with the pipe 108 a check valve, permitting flow only from the pipe 108 toward and into the passageway.

The above-described engine 10 supercharges the cylinders 64 and 86 with an air-gasoline mixture which is always the same as the charging mixture drawn directly into the cylinders 64 and 86, and the throttle control of the carburetor varies the mixture identically for charging and supercharging throughout the range of speed of the engine from idling to full speed.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a four-cycle supercharging engine,
   an air-fuel mixture supplying device,
   a cylinder having a charging end and a supercharging end,
   a piston in the cylinder reciprocable in and dividing the cylinder into a charging chamber and supercharging chamber,
   and valve means connecting the supplying device to the supercharging chamber while the piston is moved toward the charging end of the cylinder, connecting the supplying device to the charging chamber during the first part of movement of the piston toward the supercharging end of the cylinder, closing the supercharging chamber during said first part of the movement of the piston toward the supercharging end of the cylinder, and connecting the supercharging chamber to the charging chamber during the latter part of movement of the piston toward the supercharging end of the cylinder.

2. In a four-cycle supercharging engine,
   a pair of cylinders arranged in tandem,
   a pair of pistons in the cylinders and connected together for movement as a unit,
   one of the pistons dividing the cylinder in which it is mounted into a firing chamber at one end thereof and a supercharging chamber at the other end thereof,
   a carburetor,
   intake valve means connecting the carburetor alternately to the firing chamber and to the other cylinder on alternate strokes of the pistons in a direction in which said one of the pistons moves to expand the firing chamber,
   exhaust valve means connecting the firing chamber and said other cylinder alternately to exhaust during alternate strokes of the pistons in a direction in which said one of the pistons moves to contract the firing chamber,
   and further valve means connecting the supercharging chamber to the carburetor during each stroke of said one of the pistons in a direction expanding the supercharging chamber to draw an air-fuel mixture into the supercharging chamber, closing the supercharging chamber during the initial portion of each stroke of said one of the pistons in a direction contracting the supercharging chamber to compress the air-fuel mixture therein and connecting the supercharging chamber to the firing chamber and said other cylinder during the latter portions of alternate strokes of said one of the pistons in said direction contracting the supercharging chamber.

3. In a four-cycle supercharging engine,
a pair of cylinders arranged in tandem,
a pair of pistons in the cylinders and connected together for movement as a unit,
one of the pistons dividing the cylinder in which it is mounted into a firing chamber at one end thereof and a supercharging chamber at the other end thereof,
a carburetor,
first intake valve means for connecting the carburetor to the firing chamber,
second intake valve means for connecting the carburetor to the other cylinder,
exhaust valve means connecting the firing chamber and said other cylinder alternately to exhaust during alternate strokes of the pistons in a direction in which said one of the pistons moves to contract the firing chamber,
and rotary valve means connecting the supercharging chamber to the carburetor during each stroke of said one of the pistons in a direction expanding the supercharging chamber to draw an air-fuel mixture into the supercharging chamber, closing the supercharging chamber during the initial portion of each stroke of said one of the pistons in a direction contracting the supercharging chamber to compress the air-fuel mixture therein and connecting the supercharging chamber to the firing chamber and said other cylinder during the latter portion of alternate strokes of said one of the pistons in said direction contracting the supercharging chamber.

4. The four-cycle supercharging engine of claim 3 wherein the rotary valve means includes a fixed sleeve having a pair of ports in communication with the intake valve means and a third port connected to the supercharging chamber, and a rotor sleeve having a fourth port connected to the carburetor, a fifth port adapted to open the pair of ports, and sixth and seventh ports adapted to open the third port.

5. The four-cycle supercharging engine of claim 4 wherein there is provided a check valve positioned between the carburetor and the fourth port.

6. In a four-cycle supercharging engine,
an upper head,
an upper cylinder block secured to the upper head and having therein an upper cylinder having a supercharging port at the lower end thereof,
a lower head secured to the bottom of the upper cylinder and having a guide bore therethrough,
a lower cylinder block secured to the head and having a lower cylinder therein,
a piston unit including an upper piston reciprocable in the upper cylinder and dividing the upper cylinder into an upper firing chamber and a lower supercharging chamber, and a lower piston reciprocable in the lower cylinder,
a carburetor,
rotary valve means,
piping means connecting the carburetor to the rotary valve means,
check valve means permitting only flow from the carburetor toward the rotary valve means,
upper intake and exhaust valve means including an upper intake valve communicating with the firing chamber,
lower intake and exhaust valve means including a lower intake valve communicating with the lower cylinder,
upper manifold means connecting the upper intake valve to the rotary valve means,
lower manifold means connecting the lower intake valve to the rotary valve means,
a passageway connecting the rotary valve means to the supercharging chamber,
timing means for operating the valve means in synchronism with the movements of the piston unit,
lower ignition means for firing the lower cylinder,
the rotary valve means being provided with first port means connecting the carburetor to the passageway during each upward stroke of the piston unit, second port means connecting the carburetor to the upper manifold means during alternate downward strokes of the piston unit, closing the passageway during the initial portions of said alternate downward strokes of the piston unit and connecting the passageway to the upper manifold means during the latter portion of said alternate downward strokes of the piston unit, and third port means connecting the carburetor to the lower manifold means during the other downward strokes of the piston unit, closing the passageway during the initial portions of said other downward strokes of the piston unit and connecting the passageway to the lower manifold means during the latter portions of said other downward strokes of the piston unit,
and means for actuating the ignition means to fire alternately the firing chamber and the lower cylinder near the ends of the upward strokes of the piston unit.

7. In a four-cycle supercharging engine,
an upper head,
an upper cylinder block secured to the upper head and having therein an upper cylinder having a supercharging port at the lower end thereof,
a lower head secured to the bottom of the upper cylinder and having a guide bore therethrough,
a lower cylinder block secured to the lower head and having a lower cylinder therein,
a piston unit including an upper piston reciprocable in the upper cylinder and dividing the upper cylinder into an upper firing chamber and a lower supercharging chamber, a lower piston reciprocable in the lower cylinder,
a carburetor,
a fixed rotary valve sleeve having a first outlet port, a second outlet port spaced therearound from the first outlet port and a first supercharging port spaced therealong from the outlet ports,
a valve rotor sleeve having an inlet port at one end thereof, a thrid outlet port movable alternately to the first and second outlet ports and a pair of supercharging ports movable alternately into communication with the supercharging port,
check valve means permitting only flow from the carburetor toward the inlet port,
upper intake and exhaust valve means including an upper intake valve communicating with the firing chamber,
lower intake and exhaust valve means including a lower intake valve communicating with the lower cylinder,
upper manifold means connecting the upper intake valve to the first outlet port,
lower manifold means connecting the lower intake valve to the second outlet port,
a passageway connecting the first supercharging port to the supercharging chamber,
timing means for operating the valve rotor sleeve in synchronism with the movements of the piston unit,
upper ignition means for firing the firing chamber,
lower ignition means for firing the lower cylinder,
and means for actuating the ignition means to fire alternately the firing chamber and the lower cylinder near the ends of the upward strokes of the piston unit.

8. In a four-cycle supercharging engine,
cylinder means having a head end and a crankcase end,
a piston reciprocable in and dividing the cylinder means into a charging chamber at the head end and a supercharging chamber at the crankcase end,
an air-fuel supplying device, and valve means connecting the supply device to the supercharging chamber while the piston is moved toward the head end of the cylinder means, connecting the supplying device to the charging chamber during the first part of movement of the piston toward the crankcase end of the cylinder means in an intake stroke of the piston, closing the supercharging chamber from the charging chamber during said first part of the movement of the piston in its intake stroke, and connecting the supercharging chamber to the charging chamber during the latter part of said intake stroke of the piston.

9. In a four-cycle supercharging engine,
carburetor means,
cylinder means having a head end and a crankcase end,
a piston reciprocable in the cylinder means and dividing the cylinder means into a charging chamber at the head end and a supercharging chamber at the crankcase end, the piston having intake, compression, power and exhaust strokes,
manifold means,
positively driven intake valve means connecting the manifold means to the charging chamber only during the intake stroke of the piston,
and valve means for connecting the carburetor means to the supercharging chamber during the exhaust stroke of the piston, connecting the carburetor means directly to the manifold means during only the first part of the intake stroke of the piston, and connecting the supercharging chamber to the manifold means during the part of the intake stroke of the piston after said first part thereof.

References Cited by the Examiner
UNITED STATES PATENTS

| | | | |
|---|---|---|---|
| 912,012 | 2/1909 | Matson | 123—57 |
| 1,018,372 | 2/1912 | Rigly | 123—57 |
| 1,192,456 | 7/1916 | Rathburn | 123—57 |

MARK NEWMAN, *Primary Examiner.*
WENDELL E. BURNS, *Examiner.*